(12) United States Patent
Pal

(10) Patent No.: US 6,968,498 B1
(45) Date of Patent: Nov. 22, 2005

(54) SYSTEM AND METHOD FOR VERIFYING VALIDITY OF TRANSMISSION DATA BASED ON A NUMERICAL IDENTIFIER FOR THE DATA

(75) Inventor: Suprio Pal, Corona, CA (US)

(73) Assignee: Unisys Corporation, Blue Bell, PA (US)

(*) Notice: Subject to any disclaimer, the term of this patent is extended or adjusted under 35 U.S.C. 154(b) by 432 days.

(21) Appl. No.: 10/163,105

(22) Filed: Jun. 4, 2002

(51) Int. Cl.[7] .............................................. G06F 11/10
(52) U.S. Cl. .................... 714/807; 714/48; 714/701
(58) Field of Search ............................... 714/799, 807, 714/808, 48, 52, 701; 380/278; 709/236

(56) References Cited

U.S. PATENT DOCUMENTS

| | | | | |
|---|---|---|---|---|
| 5,850,526 A * | 12/1998 | Chou | ............... | 709/247 |
| 6,430,623 B1 * | 8/2002 | Alkhatib | ............... | 709/245 |
| 6,609,224 B1 * | 8/2003 | Jonsson | ............... | 714/758 |
| 2001/0002212 A1 * | 5/2001 | Asano et al. | ............... | 380/278 |
| 2002/0178283 A1 * | 11/2002 | Robinson | ............... | 709/236 |
| 2002/0186844 A1 * | 12/2002 | Levy et al. | ............... | 380/231 |

* cited by examiner

Primary Examiner—Guy Lamarre
Assistant Examiner—John P. Trimmings
(74) Attorney, Agent, or Firm—Nathan Cass; Alfred W. Kozak; Mark T. Starr

(57) ABSTRACT

In a computer-based information system where verification of transmitted data is performed, a method is disclosed for verifying validity of transmission data based on a numerical identifier for the transmission data. The method includes generating a first number based on the transmission data and obtaining a numerical identifier for the transmission data. The method further includes generating a second number from the first number and the numerical identifier, and verifying the validity of the transmission data based on the second number. In this way, based on the numerical identifier included in the transmission data, it can be verified if a recipient of the transmission data is the intended recipient and/or if the transmission data is validly attempting to access a data structure.

32 Claims, 7 Drawing Sheets

SYSTEM AND METHOD FOR VERIFYING VALIDITY OF TRANSMISSION DATA BASED ON A NUMERICAL IDENTIFIER FOR THE DATA

FIELD OF THE INVENTON

This invention relates to the field of data verification such as in computer based information systems. More particularly, the present invention is directed to a method and system for verifying the validity of transmitted data in a computer based information system.

BACKGROUND OF THE INVENTON

Computer based information systems are in widespread use today, ranging from simple small area file-sharing networks to global and sophisticated computer networked databases which provide the backbone for today's World Wide Web.

Computer based information systems comprise of a number of component nodes such as personal computers that communicate with one another, generally via a wide spectrum of communication mediums, such as local are networks (LAN) and wide area networks (WAN). Often, transmission data such as a data file or a system command message to be transmitted, is sent from a sender component node and traverses through numerous intermediary nodes such as network hubs, routers, bridges etc in these communication mediums before arriving at a recipient node. Generally, a set of predetermined communication protocols such as TCP/IP protocols are used to route the transmission data through these networks to a recipient, by using the recipient's destination address, such as the Internet Protocol (IP) address, typically included as part of transmission packet containing the transmission data.

Of essence in these communications is maintaining the integrity and correct delivery of the transmission data. Transmitted data are subject to transmission errors and other factors along the way that would lead to their corruption, as well as routing errors and mishaps that may result in their delivery to unintended recipients. These errors may have been brought upon by any combination of faulty or mismatching hardware or software, including usage of various middleware software supplied by different vendors. Currently, each of the two concerns of maintaining the integrity of the transmission data and delivery to the intended recipient have been addressed using separate solutions, one for each concern, which are then separately used at different stages of the data transmission. This approach, however, has important shortcomings as described below.

One common method for detection of data corruption in the communicated data during the transmission is the use of a generated checksum value. The checksum procedure begins at the sender location where a transmission message data to be transmitted over the network is initially broken into a set of data segments of predetermined length, such as into data octets. The checksum value is typically formed by adding together all data octets within the message. The checksum is then sent by the sender with the transmission packet containing the message data, typically as part of the header information for the message packet. When the data is received at the message destination, all received data octets are added together by the receiver using the same method of calculating as was used by the sender, and the receiver compares the newly calculated sum against the checksum generated by and received from the sender. If the two sums match, then no transmission errors are deemed present in the message data received from the sender. The checksum therefore functions as a mathematical fingerprint for matching the message data received by a receiver to the message data sent by the sender.

One common approach for the delivery of message data to an intended recipient is based on the network protocols used to transport a message to the recipient. Currently, the data file containing the message data is included in a transmission packet such as an IP packet, which contains the internet address of the recipient, such as an IP address, typically in the packet's header. The network protocols then use the IP address contained in the header to guide the packet to a network node, such a personal computer, with that IP address.

This approach for the delivery of message data to an intended recipient, however, is not without shortcomings. The recipient's IP address information in the packet header is prone to malicious or inadvertent corruption, resulting in the alteration of the recipient's IP-address and thus delivery of the transmitted message data to an unintended recipient. The unintended recipient is typically entirely dependent on the protocols of the network on which it resides to determine whether it is the intended recipient of the packet. Thus, often so long as the recipient's address is matched to that of the corrupted address in the header, the recipient assumes that it is the intended recipient of the transmitted packet. This particularly holds true in cases of unsophisticated networks which include scant network information with each transmitted packet delivered to each node. A shortcoming of this approach is that determination of the validity of the recipient as an intended recipient is based on the information in the packet header which is separate from the message data itself. Performing a prior art checksum on the message data by the recipient will likewise fail to reveal the validity of the recipient as the intended recipient.

Currently, one existing method to safeguard against the above scenario is to generate a checksum value for the IP-address in the header, and then compare the checksum value with the checksum value of the IP-address of the recipient, generated by the recipient. If the IP-address has been altered or corrupted, the checksum values will then not match, indicating that the recipient is an unintended recipient of the message data. A shortcoming of this approach is that a malicious intruder intercepting the transmission packet may replace the IP address and the IP address checksum value in the packet's header with the IP address and the IP address checksum value of the intruder's own recipient destination, then reroute the message to that destination, at where it would be successfully received.

In addition, neither of the above approaches would safeguard against malicious or inadvertent errors in the transmission message data prior to transmission by the sender. For example, if the message data is a command message data such as one for accessing information in a row in database table based on a provided bookmark to that table, it is important that the provided bookmark addresses the correct table in the database so that malicious or inadvertent accessing of a different table in the database does not occur. In the existing art, conducting a prior art checksum operation can not determine the validity of the bookmark as one validly accessing a row in a correct database table.

An ongoing need thus exists to verify the validity of a transmission data based on the information included in the transmission data to determine whether a transmission data has been delivered to an intended recipient, or is validly used to access information stored at a recipient's location.

SUMMARY OF THE INVENTION

It is an object of the present invention to provide a system and method for verifying validity of transmission data based on a numerical identifier for the transmission data, such as the network address of the recipient of the transmission data, or a bookmark to row in a data table containing the data.

An advantage of the present invention is that a recipient of the transmission data, such as a network computer, can verify whether it is the intended recipient of the transmitted data based on the numerical identifier information for that network computer included in the transmission data.

Another advantage of the present invention is that it can be verified whether a transmission data is validly accessing information in a particular data structure based on the numerical identifier information of that data structure included in the transmission data.

These and other objects, which will become apparent as the invention is described in detail below, are provided in the context of a computer-based information system where verification of transmitted data is performed, wherein a method is disclosed for verifying validity of transmission data based on a numerical identifier for the transmission data. The method includes generating a first number based on the transmission data and obtaining a numerical identifier for the transmission data. The method further includes generating a second number from the first number and the numerical identifier, and verifying the validity of the transmission data based on the second number.

Still other objects, features and advantages of the present invention will become readily apparent to those skilled in the art from the following detailed description, wherein is shown and described only the exemplary embodiments of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings.

DETAILED DESCRIPTION OF THE INVENTION

Figure 1:
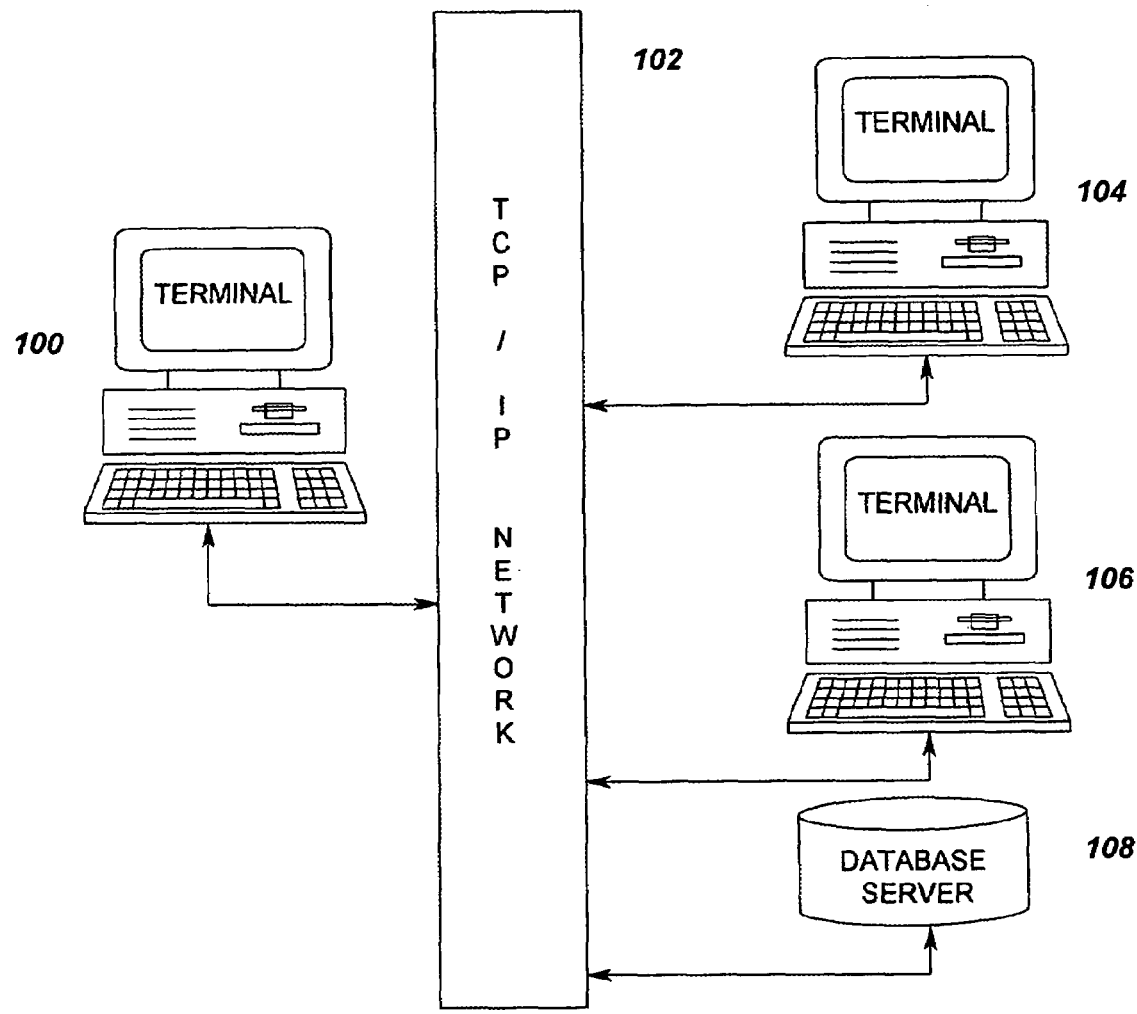
FIG. 1 is a top-level block diagram of a system that may employ the methods and systems of the present invention.

Several embodiments of the present invention are described herein in the context of verifying the validity of transmitted data in a computer based information system. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. The present invention may be practiced in conjunction with various techniques for verification of transmitted data that are conventionally used in the art, and only so much of the commonly practiced operations are included herein as are necessary to provide an understanding of the present invention. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Before proceeding with a description of the system and method of the present invention, a summary of Terminology used herein is provided, which may be helpful in understanding the disclosed embodiment.

Transmission data as used throughout this disclosure refers to data that is to be transmitted, is being transmitted as part of a data packet, or has been received subsequent to a transmission from a sender to a recipient, and includes but not limited to information contained in data tables, metadata, logical relationship data, data files such as text or image file, and system data.

Bookmarks are placeholders that enable the user to return quickly to a row in a table. Typically, a database application assigns a bookmark which points to a particular row or set of rows in a table. The user can then obtain and use the bookmark to directly access that row in a table at a later time.

Numerical Identifiers are numbers assigned to entities by which an entity is recognized or located. Examples of numerical identifiers as used throughout the detailed disclosure include a numerical designation for a data table in a database based on which the table is identified, or an address location of a recipient, such as an Internet Protocol (IP) network address for a network recipient, based on which the recipient is located.

Referring now to the drawings and FIG. 1 in particular, a top-level block diagram of a computer-based system that may employ the methods and systems of the present invention is shown. A terminal 100 such as a personal computer on which a client application may execute is illustrated. Terminal 100 utilizes communication system 102, such as a wide area network (WAN) utilizing a TCP/IP communication protocol, to communicate with other nodes in the system such as Terminals 104 and 106 and with database server 108. Communications from Terminal 100 include sending and receiving of transmission message data to and from Terminals 104 and 106, as well as transmission data for requesting, accessing and receiving of data from database 108. For simplicity, only three terminals and a database server are illustrated in FIG. 1, although it should be noted that many more network nodes such as terminals, servers etc. as well as other communication system, such as data buses, token rings, etc. utilizing other communication protocols may also be coupled to the communication system 102, and communicate with each other.

Of essence in the communications between the network nodes is maintaining the integrity and correct delivery of the transmission data. Transmitted data are subject to transmission errors and other factors along the way that would lead to their corruption, as well as routing errors and mishaps that may result in their delivery to unintended recipients. One common method for detection of data corruption in the communicated data during the transmission is the use of a generated checksum value.

Figure 2:
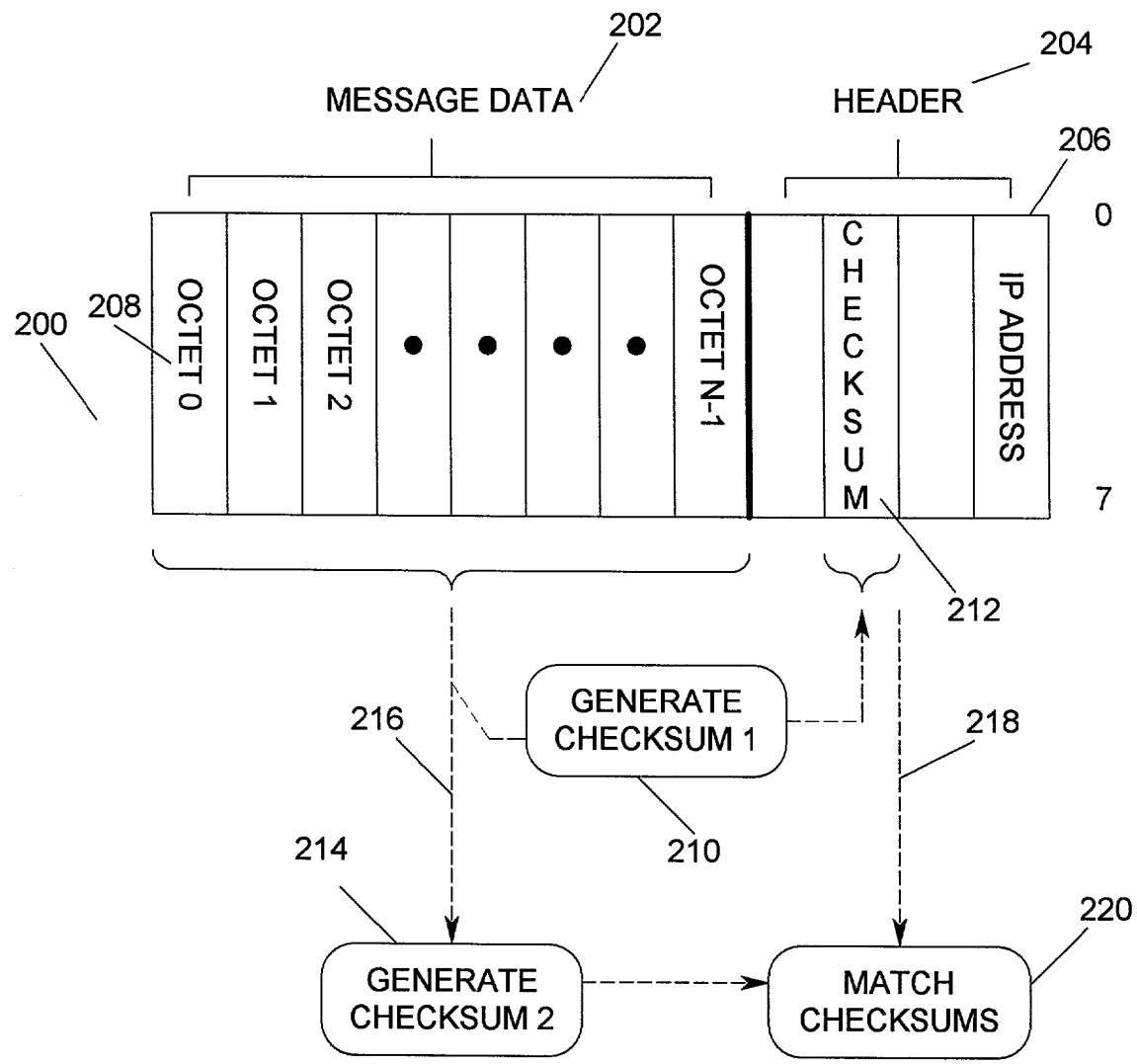
FIG. 2 is an expanded block diagram of illustrating operations of a prior art system utilizing checksums.

FIG. 2 is prior art diagram which in conjunction with FIG. 1 illustrates the use of checksum values in the context of a network communication using network data packets to transport message data between two network nodes such as between terminal 100 and terminal 104. As shown, at the sender location, such as terminal 100, a network data packet 200 is created by a network communication protocol such as TCP/IP protocol, in which is included a transmission data such as a message data 202 be sent to a recipient, such as to terminal 104. A data packet header 204, such as a TCP, UDP or IP header is also included in the data packet 200. The packet header 204 contains a number of data fields such as data field 206 for storage of information, generally routing information such as the IP network address of the sender and of the recipient, which are used by the communication protocols of communication system 102 to deliver the data packet 200 to the recipient terminal 104. The message data 202, such as a data file, is typically subdivided into a series of data fields, such as data field 208, which are of predetermined length such as 8-bit octets as shown in FIG. 2. As shown by the process block 210, the checksum operation is then performed at the sender terminal 100 on the message data, such as by summation of all 8-bit octets in the message data 202 to produce a checksum1 value for the message data 202. The checksum1 value is then stored in a predetermined field in the packet header 204 for storage of checksum values, such as the checksum field 212. Then the entire data packet 200 is transmitted across the communication system 102, to the recipient terminal 104.

Upon arriving at the recipient terminal 104, the integrity of the message data 202 can be determined by the use of checksums operations. As shown by the process flow 216, at recipient terminal 104 the received message data 202 is retrieved from the data packet 200, and from which a checksum2 value is generated in process block 214 using the same checksum operations used by the sender terminal 100 to generate checksum1. Then, as shown by the process flow 218, the received checksum1 value is retrieved from the checksum field 212 in the packet header 204, where it is matched with the generated checksum2 at process block 220. If a match results by checksum1 being identical to checksum2, then the integrity of message data 202 is deemed to have not been compromised. If the two checksum fail to match, then the integrity of message data 202 is deemed to have been comprised (i.e. the message data had been corrupted) during the transmission from terminal 100.

While using prior art checksum operations may determine whether a message data 202 has been corrupted, it does not safeguard against the incorrect delivery of the transmission data to an unintended recipient. For example, if the data packet 200 in the above scenario was erroneously or maliciously delivered to terminal 106 instead of terminal 104, then terminal 106 would not be able to determine that it is the unintended recipient of the data packet 200 simply by performing checksum operations on the message data 202, particularly if the message data 202 was not corrupted during the transmission. Terminal 106 would then not become aware of the wrong delivery of the message data 202 in order to take the appropriate measures such as refusing the delivery, returning the packet to the sender, or notifying a system administrator.

Figure 3:
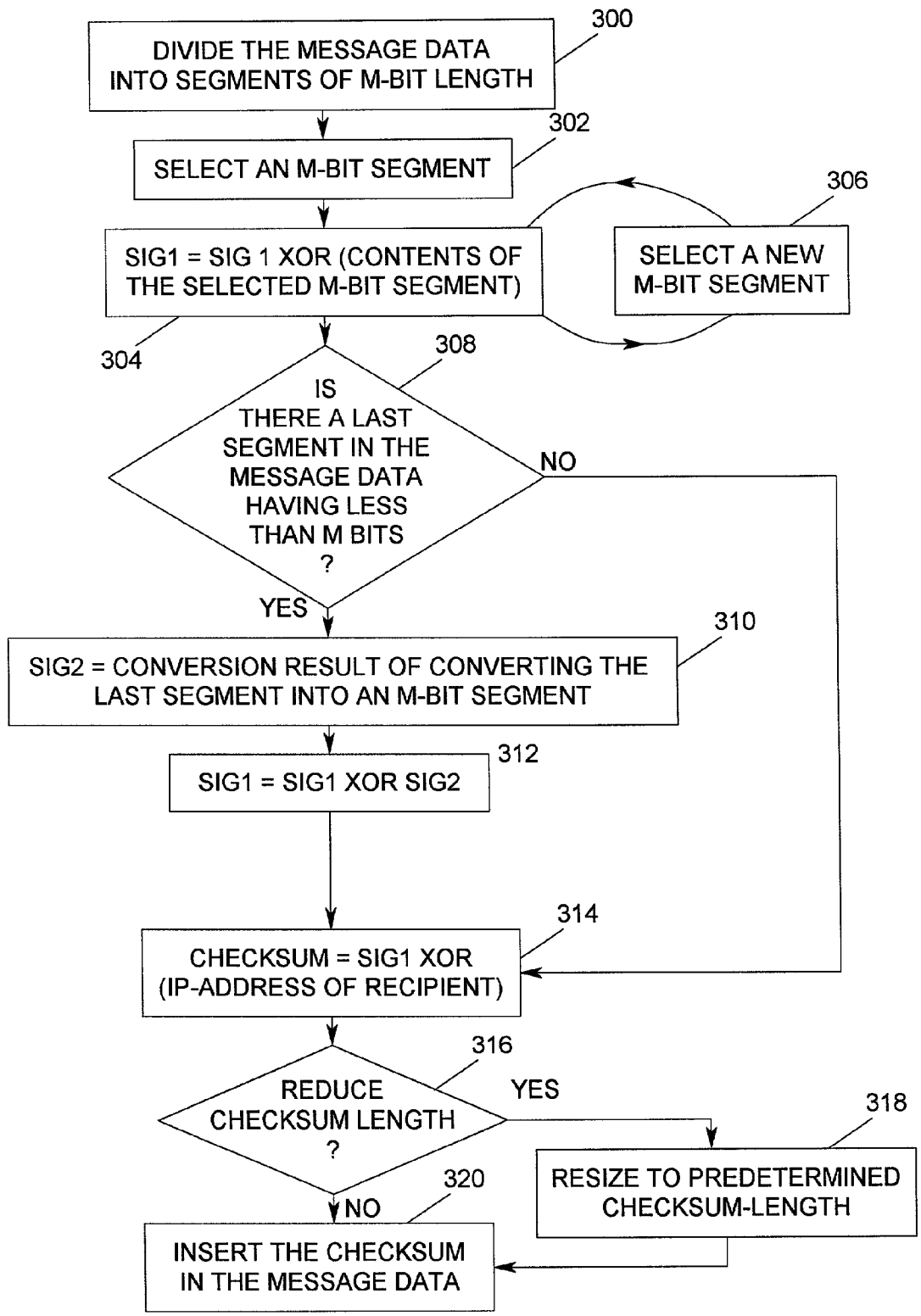
FIG. 3 is a flow chart of a process for verification of transmission data according to a method of the present invention.

FIG. 3 is a flow chart of an exemplary process for verification of transmission data according to a method of the present invention. As shown, at block 300 the message data is divided or partitioned into a number of segments, each of which are of a predetermined length 'm'. In the exemplary embodiment of FIG. 3, the message data is divided into 64-bit segments for a more favorable distribution of bits to reduce the chance of checksum collision (when the same checksum value is generated for different inputs) although other segments lengths such as 8-bit, 16-bit etc can also be used. Next, at block 302, a 64-bit segment such as the first 64-bit segment in the message data is selected for processing in block 304 where a new number Sig1 is generated from the contents of the select 64-bit segment based on predetermined mathematical functions, such as Boolean Exclusive OR (XOR) operations. Other mathematical operations such as use of prime numbers and various encryption operations well known in the art may also be used in conjunction with or in the place of the XOR operation to increase the uniqueness of the generated Sig1 value and thus reduce the chances of collision, and to serve as added protection against unauthorized accesses. In an exemplary embodiment, Sig1 is of the same bit length as 'm' in block 300, such as 64 bit, and is initially set to a predetermined secret number for added security.

Blocks 304 and 306 represent an iterative flow where a new 64-bit segment is selected from the message data and XOR-ed with the Sig1 generated by the previous 64-bit segment to generate a new Sig1. The iterative flow between blocks 304 and 306 is repeated until all 64-bit segments in the message data have been processed, thus Sig1 that is based on the data contents in all of the 64-bit segments in the message data. Since it is important for Sig1 to be based on all the data bits in the message data, at decision block 308 a determination made as to whether the message data had been precisely divided into m-bit segments, or if there are any remainder bits that were less than m-bits. For example, if the message data is 160-bits long and is divided into 64-bit segments in block 300, then two 64-bit segments and a remainder data segment of 32 bits would result.

If there are remainder segments of less than m-bits, then the flow proceeds to block 310 where the remainder data bits are converted into an m-bit format and stored as Sig2, such as converting the remainder 32 bit of data in the above example into a 64-bit number format. In an exemplary embodiment, a casting process well known in the art is used to accomplish the conversion. Next, in block 312 a final Sig1 is generated from Sig2 using the same mathematical function used in block 304, and is thus based on all the data bits in the message data. The flow then proceeds to block 314. If at the decision block 308 it is determined that there are no remainder segments of less than m-bits in the message data, signifying that the latest generated Sig1 in block 304 is the final Sig1 and based on all the data bits in the message data, then the flow proceeds directly to block 314.

At block 314, a checksum value is generated based on the final Sig1 and a numerical identifier for the final intended recipient of the message data, such as the IP-address of the recipient. In an exemplary embodiment, the checksum value is generated by performing mathematical operations that will result in the generation of a unique checksum value to minimize the possibility of checksum collision. The mathematical checksum operation performed in block 314 may or may not be the same mathematical operation performed earlier in the process such as in blocks 304 and 312. In the exemplary embodiment of FIG. 3 an XOR operation is performed on the final Sig1 and an m-bit converted IP-address of the recipient of the message data. It should be noted the that use of the numerical identifier for the final intended recipient is not limited to block 314 and may be included at different stages of the overall mathematical operations described in FIG. 3, such as in block 310, and in block 304 by for example initially setting the Sig1 value in to the numerical identifier. In an exemplary embodiment, the checksum value is typically calculated immediately after the message data has been created or modified.

In the decision block 316, it is determined whether the length of the checksum value needs to be reduced in order to fit within a predetermined storage location in the message data. For example, if the predetermined storage location in the message is only 16-bits (two bytes) long, then a 64-bit checksum value must be reduced in order to be accommodated in the two byte storage location. If at decision block 316 it is determined that the length of the checksum value needs to be reduced, then the flow proceeds to block 318 where a reduction operation is performed, such as a (MODULO by $(2^{16}-1)$) operation, to reduce the size of the checksum to 16-bits. The checksum value is then inserted into the message data in block 320 to be transmitted as part of the message data. If at decision block 316 it is determined that the length of the checksum value needs not be reduced, then the flow proceeds directly to block 320 where the checksum value is then inserted into the message data to be transmitted as part of the message data.

One advantage of the foregoing feature of the present invention over the prior art is that the checksum value generated by the method of the present invention is based on a numerical identifier of the recipient of the message, thus to make the message data unique to that recipient based on the content of the message data, and irrespective of an IP-address of the recipient included separately in the packet header portion of a transmitted data packet. It should be noted that the checksum operation described in FIG. 3 is exemplary only and other checksum operations such as a parity or cyclic redundancy check, hashing functions, summation of the number of bits in the packet equal to "1", summation of the numerical values represented by the data, etc. which incorporate a recipient's numerical identifier at various stages in the generation of the checksum value can also be used in place of or in conjunction with the checksum operation described in FIG. 3 and are contemplated to be within the scope of the present invention.

Figure 4A:
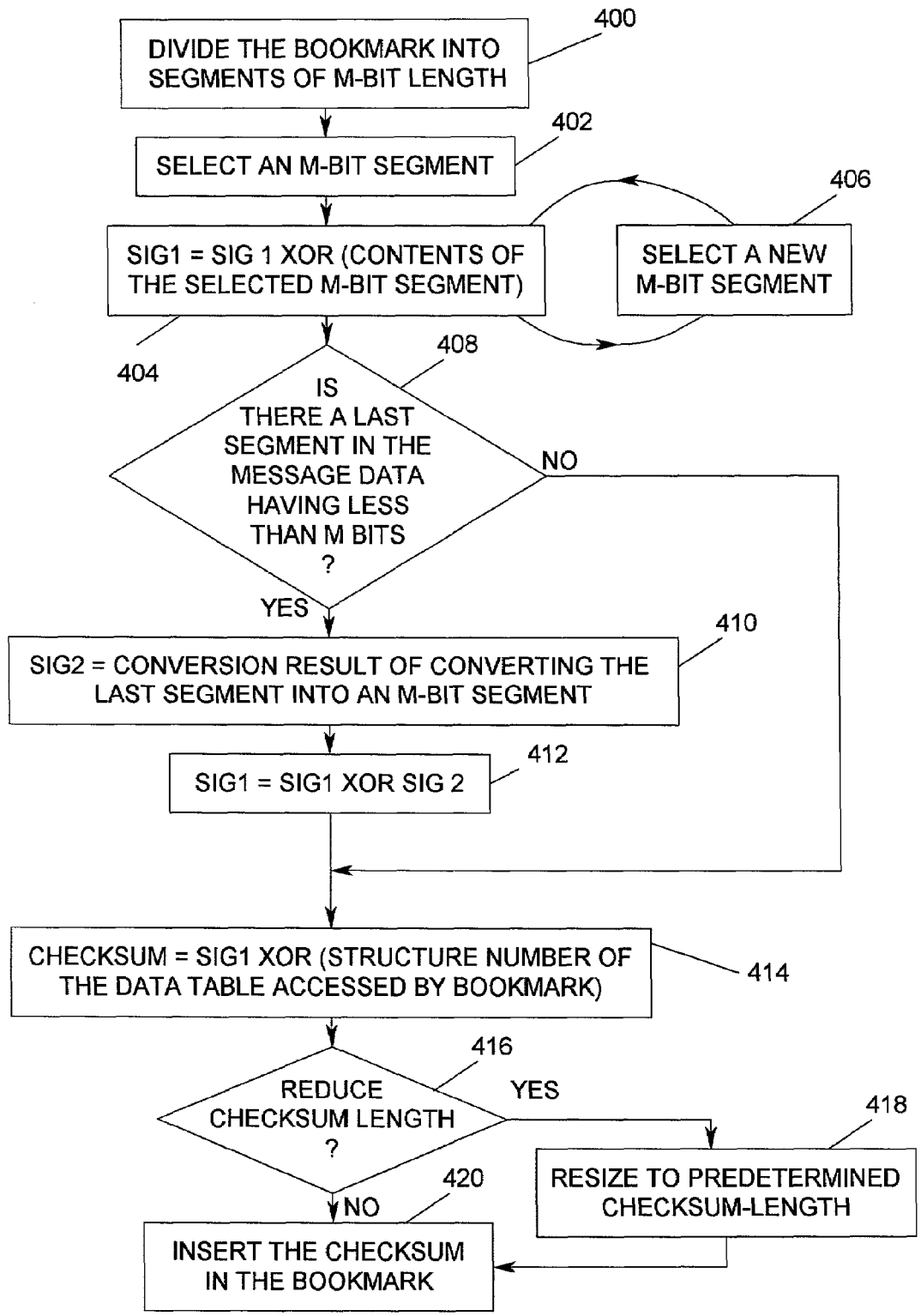
FIG. 4A is a flow chart of a process for verification of transmission data according to another method of the present invention.
Figure 4B:
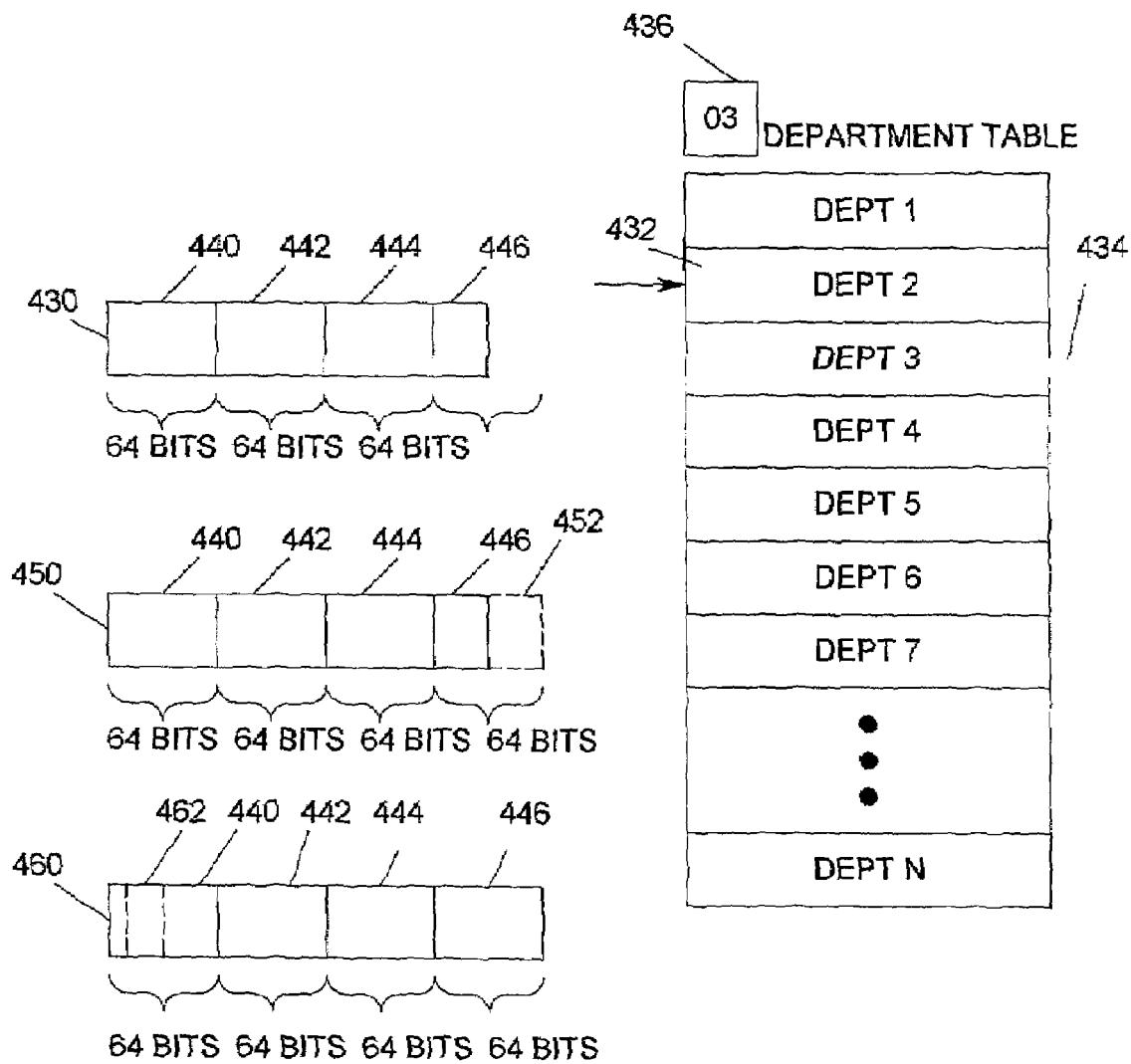
FIG. 4B is a schematic diagram illustrating the concept of bookmarks and table structure numbers in a database as used in the process described in FIG. 4A.

Another method of verification of transmission data of the present invention is illustrated in FIG. 4A in conjunction with FIG. 4B. FIG. 4A is a flow chart of a process for verification of transmission data in which a database is accessed from a remote terminal by use of a bookmark. FIG. 4B is a schematic diagram illustrating the concept of bookmarks and table structure numbers in a database as used in the process described in FIG. 4A.

As shown in FIG. 4B, a bookmark 430 points to the row 432 belonging to Dept 2 in the Department Table 434, located on a database such as database 108 in FIG. 1. Bookmark 430 is thus a placeholder assigned by the database system software that enables a user or an application, such as one at terminal 100, to later directly access a row, such as row 432, in a table, such as table 434. When a user wishes to access a bookmarked row, the contents of the bookmark are included in a transmission, such as a method call, from the user or an application to the database, and are therefore prone to transmission corruptions. Furthermore, a user may inadvertently or maliciously try to use a bookmark to access different tables in a database to which the user may not have authorized access to or for which the bookmark may not be valid. Thus, while using prior art checksum operations may determine whether a bookmark 430 has been corrupted, it does not safeguard against the inadvertent or malicious use of a bookmark to access different tables in a database to which the user may not have authorized access to.

Returning to FIG. 4A, in block 400, a bookmark is divided or partitioned into a number of segments of predetermined length 'm'. In the exemplary embodiment of FIG. 4B, the bookmark 430 is divided into 64-bit segments such as segments 440, 442, and 444 for a more favorable distribution of bits to reduce the chance of checksum collision (when the same checksum value is generated for different inputs) although other segments lengths such as 8-bit, 16-bit etc can also be used. Next, at block 402 of FIG. 4A, as a 64-bit segment the first 64-bit segment in the bookmark, such as segment 440, is selected for processing in block 404 where a new number Sig1 is generated from the contents of the select 64-bit segment 440 based on a predetermined mathematical function, such as an Exclusive OR (XOR) operations. Other mathematical operations such as use of prime numbers and various encryption operations well known in the art may also be used in conjunction with or in the place of the XOR operation to increase the uniqueness of the generated Sig1 value and thus reduce the chances of collision, and to serve as added protection against unauthorized accesses. In an exemplary embodiment, Sig1 is of the same bit length as 'm' in block 400, such as 64 bit, and is initially set to a predetermined secret number for added security.

Blocks 404 and 406 represent an iterative flow where a new 64-bit segment, such as segment 442, is selected from the bookmark 430 and XOR-ed with the Sig1 generated by the previous 64-bit segment 440 to generate a new Sig1. The iterative flow between blocks 404 and 406 is repeated until all 64-bit segments 440, 442 and 444 in the bookmark 430 have been processed, thus generating a Sig1 that is based on the data contents in all of the 64-bit segments in the bookmark 430. Since it is important for Sig1 to be based on all the data bits in the bookmark 430, at decision block 408 a determination made as to whether the bookmark had been precisely divided into m-bit segments, or if there are any remainder bits that were less than m-bits. For example, if the bookmark 430 is 234-bits long and is divided into 64-bit segments in block 400, then three 64-bit segments 440, 442 and 444 and a remainder data segment 446 of 42 bits would result.

If there is a remainder segment of less than m-bits, then the flow proceeds to block 410 where the remainder data bits are converted into an m-bit format and stored as Sig2, such as converting the remainder 42 bit of data in segment 446 into a 64-bit number format. In an exemplary embodiment, a casting process well know in the art is used to accomplish the conversion. Next, in block 412 a final Sig1 is generated from Sig2 using the same mathematical function used in block 404, and is thus based on all the data bits in the bookmark. The flow then proceeds to block 414. If at the decision block 408 it is determined that there is no remainder segment of less than m-bits in the bookmark, signifying that the latest generated Sig1 in block 404 is the final Sig1 and based on all the data bits in the bookmark 430, then the flow proceeds directly to block 414.

At block 414, a checksum value is generated based on the final Sig1 and a numerical identifier for the data structure to which the bookmark points, such as the structure number 436 of the table 434 in FIG. 4B. The structure number is a numerical designation assigned to data structure, such as a data table in a database, by database system software based on which the data structure is identified. In an exemplary embodiment, the checksum value is generated by performing mathematical operations that will result in the generation of a unique checksum value to minimize the possibility of checksum collision. The mathematical checksum operation performed in block 414 may or may not be the same mathematical operation performed earlier in the process such as in blocks 404 and 412. In the exemplary embodiment of FIG. 4 an XOR operation is performed on the final Sig1 and an m-bit converted structure number of the data table. It should be note the that use of the numerical designation for the data structure is not limited to block 414 and may be included at different stages of the overall mathematical operations described in FIG. 4, such as in block 410, and in block 404 by for example initially setting the Sig1 value in to the numerical designation for the data structure. In an exemplary embodiment, the checksum value is typically calculated immediately after the bookmark has been created or modified.

In the decision block 416, it is determined whether the length of the checksum value needs to be reduced in order to fit within a predetermined storage location in the bookmark. Generally, a checksum is included in a bookmark by either appending the checksum to the end of the bookmark, such as by appending segment 452 to bookmark 450 in FIG. 4B, or by inserting the checksum in predetermined bytes checksum for storage of checksum values such as in storage bytes 462 in segment 440 of bookmark 460. For example, if storage bytes 462 in segment 440 of bookmark 460 are only 16-bits (two bytes) long, then a 64-bit checksum value must be reduced in order to be accommodated in the two bytes space. If at decision block 416 it is determined that the length of the checksum value needs to be reduced, then the flow proceeds to block 418 where a reduction operation is performed, such as a (MODULO by $(2^{16}-1)$) operation, to reduce the size of the checksum to 16-bits. Next, in block 420, the checksum value is then inserted into the bookmark, such as in storage bytes 462 in segment 440 of bookmark 460 to be transmitted as part of the bookmark. If at decision block 416 it is determined that the length of the checksum value needs not be reduced, such as when the checksum can be readily inserted in storage bytes 462 in segment 440 of bookmark 460 or appended in the form of segment 452 to bookmark 450, then the flow proceeds directly to block 420 where the checksum value is then included as part of the bookmark to be transmitted.

One advantage of the foregoing feature of the present invention over the prior art is that the checksum value generated by the method of the present invention is based on a numerical designation for the data structure, such as a data table, accessed by the bookmark, thus to make the bookmark unique to that table based on the content of the bookmark. It should be noted that the checksum operation described in FIG. 3 is exemplary only and other checksum operations such as a parity or cyclic redundancy check, hashing functions, summation of the number of bits in the packet equal to "1", summation of the numerical values represented by the data, etc. which incorporate a numerical designation for the data structure at various stages in the generation of the checksum value can also be used in place of or in conjunction with the checksum operation described in FIG. 3 and are contemplated to be within the scope of the present invention.

Figure 5:
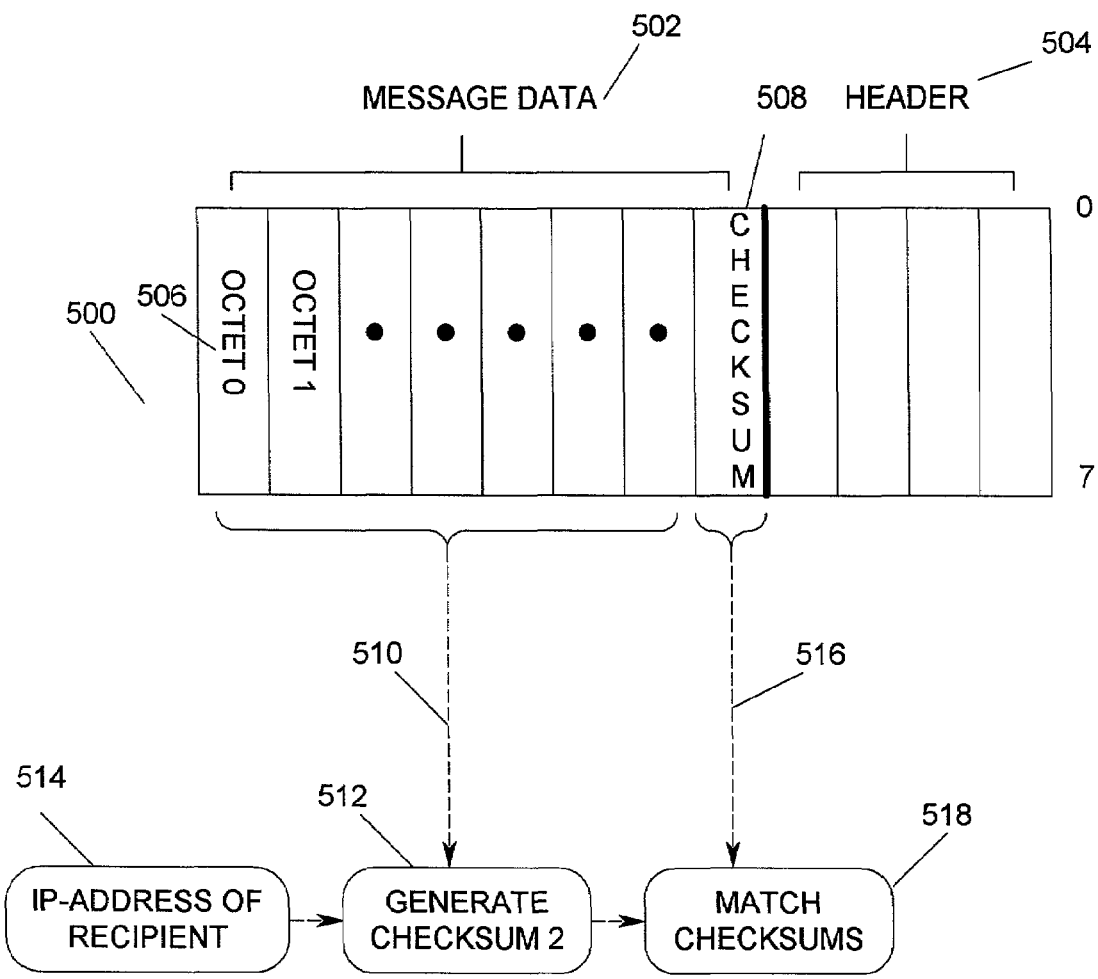
FIG. 5 is a schematic diagram further illustrating the process for verification of transmission data according to the method of the present invention described in FIG. 3.

FIG. 5 is a schematic diagram further illustrating the process for verification of transmission data according to the method of the present invention described in FIG. 3. As shown, the network data packet 500 is received at a recipient location such as terminal 104 in FIG. 1. The network data packet 500 includes the message data 502 and packet header 504. The message data is typically subdivided into a series of data fields, such as data field 506, which are of predetermined length such as 8-bit octets as shown in FIG. 5. As shown, the checksum value generated by the process described in FIG. 3 has been stored in a predetermined field 508 in the message data 502 portion of the network data packet 500.

To determine the validity of the received message data, the recipient extracts the message data 502 as shown by the process flow 510. A checksum2 value is then generated in block 512 using the same checksum operations used by the sender as described in FIG. 3, except that the recipient would independently obtain its numerical identifier such as its IP-address obtained from block 514, to use in the checksum2 generation operation. Next, as shown in process flow 516, the checksum value generated by the sender is extracted from the message data 502 portion and compared with the checksum2 value in block 518. If a match results by the received checksum being identical to checksum2, then the message data 502 has been verified to be valid by being delivered to the intended recipient. If the message data 502 was delivered to an unintended recipient, the two checksums will fail to match since the IP-address of the unintended recipient obtained from block 514 would be different than that of the IP-address of the intended recipient used by the sender in FIG. 3, therefore the checksums generated based on these two different IP-addresses will fail to match. The recipient will then become aware of the wrong delivery of the message data 502 and can take appropriate measures such as refusing the delivery, returning the packet to the sender, or notifying a system administrator.

One advantage of the foregoing feature of the present invention over the prior art is that the recipient can verify whether it is the intended or unintended recipient of a message data based on the checksum value included in the message data itself, and independent of the communication protocol information in the a header portion of a data packet, or obtained from network protocols.

Figure 6:
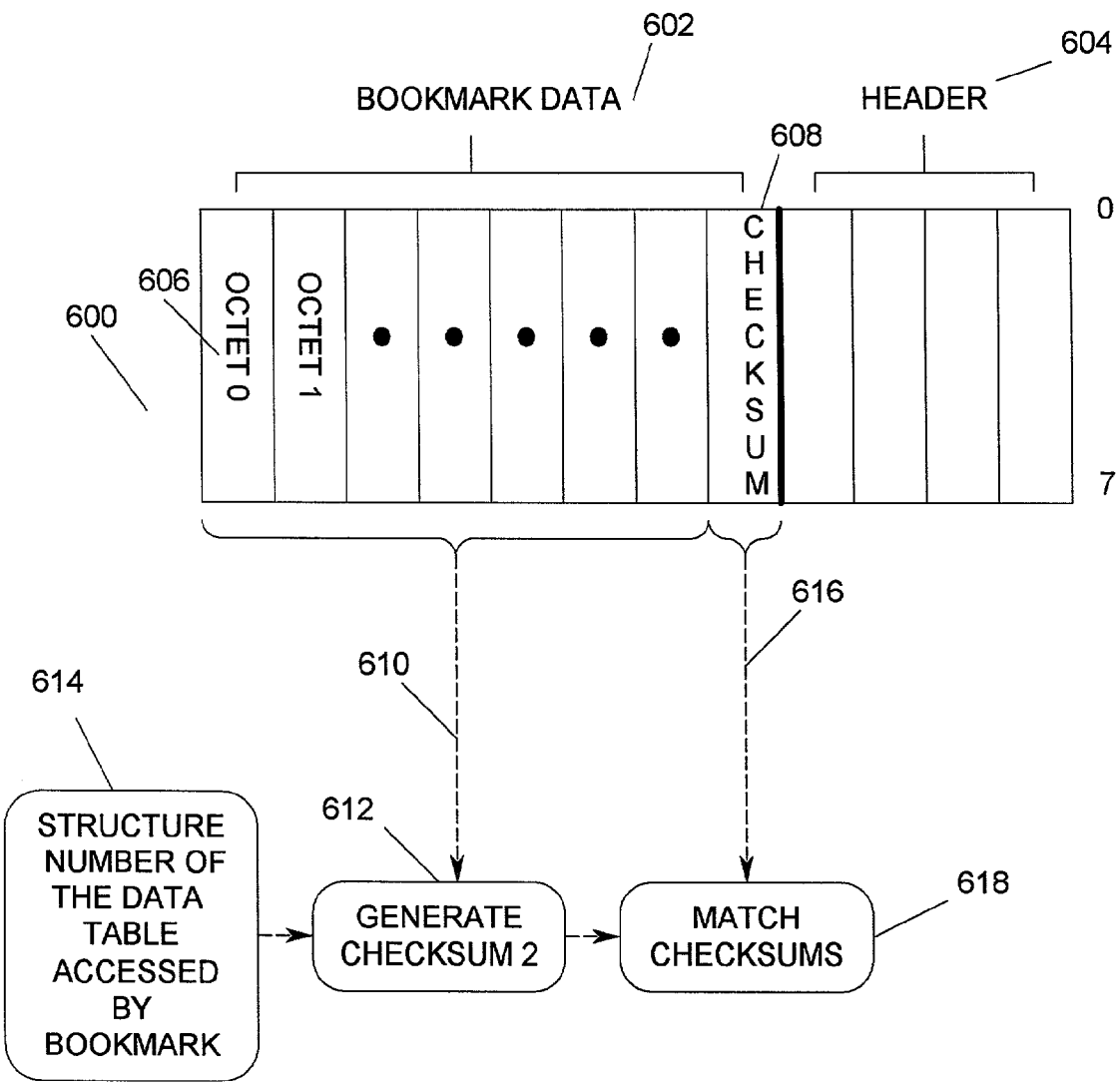
FIG. 6 is a schematic diagram further illustrating the process for verification of transmission data according to the method of the present invention described in FIG. 4A.

FIG. 6 is a schematic diagram further illustrating the process for verification of transmission data according to the method of the present invention described in FIG. 4A. As shown, the network data packet 600 is received at a recipient location such database server 108 in FIG. 1. The network data packet 600 includes the bookmark 602 and packet header 604. The bookmark is typically subdivided into a series of data fields, such as data field 606, which are of predetermined length such as 8-bit octets as shown in FIG. 6. As shown, the checksum value generated by the process described in FIG. 4A has been stored in a predetermined field 608 in the bookmark 602 portion of the network data packet 600.

To determine the validity of the received bookmark, the database server 108 extracts the bookmark 602 as shown by the process flow 610. A checksum2 value is then generated in block 612 using the same checksum operations used by the sender as described in FIG. 4A, except that the database server 108 would independently obtain from block 614, the numerical identifier such as the structure number of the data table that the received bookmark attempts access, for use in the checksum2 generation operation. Next, as shown in process flow 616, the checksum value generated by the sender is extracted from the bookmark 602 portion and compared with the checksum2 value in block 618. If a match results by the received checksum being identical to checksum2, then the bookmark 602 has been verified to be validly accessing a data table. If the bookmark 602 is attempting to access a different data table, the two checksums will fail to match since the structure number of the data table obtained from block 614 would be different than that of the structure number of the data table used by the sender in FIG. 4A, and therefore the checksums generated based on these two different structure numbers will fail to match. The database server will then become aware of the wrongful access by the bookmark 602 and can take appropriate measures such as refusing the granting of access, returning the packet to the sender, or notifying a system administrator.

One advantage of the foregoing feature of the present invention over the prior art is that the database server can verify whether it is has received a valid bookmark based on the information included in the bookmark itself.

In an exemplary embodiment, the present invention is used for the data-accessing communications between a terminal 100 and the database server 108 shown in FIG. 1, as described in the patent application entitled "METHODS AND SYSTEM FOR ACCESSING LOGICAL RELATIONSHIP DATA IN A DATABASE FROM A DATA-ACCESS SYSTEM UTILIZING BOOKMARKS", filed on Jun. 4, 2002 as U.S. Ser. No. 10/163,103, the details of which are herein incorporated by reference. In this exemplary embodiment, communication between terminal 100 and the database server 108 are managed by a data-access system such as a Unisys OLE DB Data Provider utilizing bookmarks. The data-access system has a client-end and a server-end. The client-end resides on the terminal 100 and interfaces with a client application such a Windows™ client application (substantially all versions of Microsoft Windows released from 1995–2000, Windows NT and XP) executing on terminal 100. The server-end resides on and interfaces with an Enterprise Database Server 108 operating on a Clearpath Master Control Program (MCP) platform. The communication system 102, such as one using a TCP/IP communication protocol is used to provide communication between the server-end and the client-end of the data access system, and hence between terminal 100 and database server 108. In this exemplary embodiment, the foregoing process of the present invention as described in FIG. 4A, FIG. 4B and FIG. 6 can be used to determine the validity of a bookmark received at the client-end from a transfer buffer dispatched by a client application to access a data table in a database. It should be noted, however, that the present invention is not in anyway limited to the foregoing exemplary products.

It should also be noted that the various features of the foregoing embodiments were discussed separately for clarity of description only and they can be incorporated in whole or in part into a single embodiment of the invention having all or some of these features.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for verifying validity of transmission data based on a numerical identifier for said transmission data, said method comprising:

generating a first number based on said transmission data wherein said first number is generated based on at least one of a size and a content of said transmission data;

obtaining a numerical identifier for said transmission data;

generating a second number from said first number and said numerical identifier wherein said second number is a checksum number generated based on a checksum protocol;

verifying the validity of said transmission data based on said checksum number wherein said verifying is a checksum verification;

generating a checksumed data by including said checksum number with said transmission data;

transmitting said checksumed data from a sender to a recipient; and performing said checksum verification by said recipient, wherein said numerical identifier is an address location of said recipient of said checksumed data, wherein said transmission data is a message data and said address location is a network address location of said recipient of said transmitted checksumed data, and wherein said performing said checksum verification by said recipient further comprises:

generating a third number based on said received transmission data included in said received checksumed data;

obtaining an internet protocol address location of said recipient from said recipient;

generating a second checksum number based on said third number and said address location obtained from said recipient;

matching said second checksum number to said received checksum number included in said received checksumed data; and verifying the validity of said received checksumed data based on said matching wherein said verification determines at least one of an existence of a corruption in said transmission data and said received checksum number.

2. A method in accordance with claim 1, wherein said numerical identifier is a numerical designation of a data storage structure containing said transmission data.

3. A method in accordance with claim 2, wherein said data storage structure is a data table containing said transmission data, and wherein said numerical designation is a numerical table name of said data table.

4. A method in accordance with claim 3 wherein said transmission data is a bookmark referencing a predetermined row in said data table and wherein said numerical designation is a numerical table name of said referenced data table.

5. A method in accordance with claim 4, wherein said bookmark references said row in said data table based on an address location of said row.

6. A method in accordance with claim 1, wherein said message data is at least one of a data file and a command data.

7. A method in accordance with claim 6, wherein said network address location is an internet protocol address location of said recipient.

8. A method in accordance with claim 1, wherein said third number is generated based on at least one of a size and a content of said received transmission data.

9. A method in accordance with claim 1, wherein said numerical identifier is a unique numerical identifier.

10. A method in accordance with claim 1, wherein said including of said checksum number with said transmission data further comprising:
inserting said checksum number in a predetermined location in said transmission data.

11. A method in accordance with claim 10, said generating said checksum number further comprising:
converting said checksum number into a data string of predetermined length based on a size of said predetermined location in said transmission data.

12. A method in accordance with claim 5, wherein said performing said checksum verification by said recipient further comprising:
obtaining said numerical designation for said data table addressed by said bookmark in said transmission data, by said recipient;
generating the second checksum number based on said third number and said numerical designation obtained by said recipient;
matching said second checksum number to said received checksum number included in said received checksumed data; and
verifying the validity of said received transmission data based on said matching wherein said verification determines if said bookmark is validly accessing said data table.

13. A method in accordance with claim 12,
wherein said sender is a client application accessing information from a database via a data-access system utilizing bookmarks and interfacing with said client application and said database,
wherein said recipient is said data-access system, and wherein said information includes said transmission data.

14. A method in accordance with claim 13, wherein said recipient obtains said numerical designation for said data table addressed by said bookmark from said database.

15. A method in accordance with claim 14, wherein said accessing includes modifying information stored in said database.

16. A method in accordance with claim 15,
wherein said database is a network data modeled database, wherein said data-access system is a client-server data access system based on an Object Linking and Embedding Database (OLE DB) data access model, and
wherein said transmission data includes logical-relationship data and metadata obtained from said database.

17. A system for verifying validity of transmission data based on a numerical identifier for said transmission data, said system comprising:
a first generator subsystem adapted to generate a first number based on said transmission data wherein said first number is generated based on at least one of a size and a content of said transmission data;
an obtainment subsystem adapted to obtain a numerical identifier for said transmission data;
a second generator subsystem adapted to generate a second number from said first number and said numerical identifier wherein said second number is a checksum number generated based on a checksum protocol;
a verification subsystem adapted to verify the validity of said transmission data based on said second number wherein the verification provided by said verification subsystem is a checksum verification;
a communication subsystem adapted to transmit said checksumed data from a sender to a recipient,
wherein said checksum verification is performed by said recipient,
wherein said numerical identifier is an address location of said recipient of said checksumed data, wherein said transmission data is a message data,
wherein said address location is a network address location of said recipient of said transmitted checksumed data, and
wherein said recipient is adapted to perform said checksum verification and further comprising:
a third generator subsystem adapted to generate a third number based on said received transmission data included in said received checksumed data;
an obtainment subsystem adapted to obtain an internet protocol address location of said recipient from said recipient;
a fourth generator subsystem adapted to generate a second checksum number based on said third number and said address location obtained from said recipient;
a matching subsystem adapted to match said second checksum number to said received checksum number included in said received checksumed data, and to generate a matching result; and
a verification subsystem adapted to verify the validity of said received checksumed data based on said matching result wherein said verification determines at least one of an existence of a corruption in said transmission data and said received checksum number.

18. A system in accordance with claim 17, wherein said numerical identifier is a numerical designation of a data storage structure containing said transmission data.

19. A system in accordance with claim 18, wherein said data storage structure is a data table containing said transmission data and wherein said numerical designation is a numerical table name of said data table.

20. A system in accordance with claim 19, wherein said transmission data is a bookmark referencing a predetermined row in said data table and wherein said numerical designation is a numerical table name of said referenced data table.

21. A system in accordance with claim 20, wherein said bookmark references said row in said data table based on an address location of said row.

22. A system in accordance with claim 17, wherein said message data is at least one of a data file and a command data.

23. A system in accordance with claim 22, wherein said network address location is an internet protocol address location of said recipient.

24. A system in accordance with claim 23, wherein said third number is generated based on at least one of a size and a content of said received transmission data.

25. A system in accordance with claim 17, wherein said numerical identifier is a unique numerical identifier.

26. A system in accordance with claim 17, wherein said third generator subsystem adapted to generate a checksumed data further comprising:
   an insertion subsystem adapted to insert said checksum number in a predetermined location in said transmission data.

27. A system in accordance with claim 26, wherein said third generator subsystem adapted to generate a checksumed data further comprising:
   a conversion subsystem adapted to convert said checksum number into a data string of predetermined length based on a size of said predetermined location in said transmission data.

28. A system in accordance with claim 21, wherein said recipient is adapted to perform said checksum verification and further comprising:
   the obtainment subsystem adapted to obtain said numerical designation for said data table addressed by said bookmark in said transmission data, by said recipient;
   the fourth generator subsystem adapted to generate a second checksum number based on said third number and said numerical designation obtained by said recipient;
   the matching subsystem adapted to match said second checksum number to said received checksum number included in said received checksumed data, and to generate a matching result; and
   the verification subsystem adapted to verify validity of said received transmission data based on said matching result wherein said verification determines if said bookmark is validly accessing said data table.

29. A system in accordance with claim 28, wherein said sender is a client application adapted to access information from a database via a data-access system utilizing bookmarks and adapted to interface with said client application and said database, wherein said recipient is said data-access system, and wherein said information includes said transmission data.

30. A system in accordance with claim 28, wherein said recipient obtains said numerical designation for said data table addressed by said bookmark from said database.

31. A system in accordance with claim 29, wherein said client application is adapted to modify information stored in said database.

32. A system in accordance with claim 30, wherein said database is a network data modeled database, wherein said data-access system is a client-server data access system based on an Object Linking and Embedding Database (OLE DB) data access model, and wherein said transmission data includes logical-relationship data and metadata obtained from said database.

* * * * *